United States Patent [19]
Ishida et al.

[11] Patent Number: 5,067,157
[45] Date of Patent: Nov. 19, 1991

[54] NOISE REDUCTION APPARATUS IN AN FM STEREO TUNER

[75] Inventors: Kohji Ishida; Yasushi Nishimura; Shigeru Yamaguchi, all of Tokyo, Japan

[73] Assignee: Pioneer Electronic Corporation, Tokyo, Japan

[21] Appl. No.: 442,770

[22] Filed: Nov. 29, 1989

[30] Foreign Application Priority Data

Feb. 3, 1989 [JP] Japan .................................. 1-25296
Feb. 3, 1989 [JP] Japan .................................. 1-25297

[51] Int. Cl.$^5$ .............................................. H04H 5/00
[52] U.S. Cl. .......................................... 381/13; 381/1; 381/94; 381/106
[58] Field of Search .................... 381/13, 106, 94, 1, 381/3, 4, 10, 11, 17

[56] References Cited

U.S. PATENT DOCUMENTS

| | | | |
|---|---|---|---|
| 3,673,342 | 6/1972 | Muller | 179/15 |
| 3,803,357 | 4/1974 | Sacks | 381/94 |
| 3,857,104 | 12/1974 | Sacks | 328/167 |
| 3,943,293 | 3/1976 | Bailey | 179/15 |
| 4,208,547 | 6/1980 | Simeau | 179/1 |
| 4,301,541 | 11/1981 | Tanaka | 455/221 |
| 4,680,793 | 7/1987 | Sugai et al. | 381/13 |
| 4,771,464 | 9/1988 | Kadin et al. | 381/106 |
| 4,833,715 | 5/1989 | Sakai | 381/13 |

FOREIGN PATENT DOCUMENTS 1487276 2/1975 Fed. Rep. of Germany .
2338482 5/1975 Fed. Rep. of Germany .

OTHER PUBLICATIONS

Ives, Fred H., "A Noise-Reduction System: Dynamic Spectral Filtering", Journal of the Audio Engineering Society, Sep. 1972, vol. 20, No. 7, s. 558-561.
Rauschverminderung bei Tonubertragungen, Funkschau 25/1984, s. 59, 60, 49-50.

Primary Examiner—Forester W. Isen
Assistant Examiner—Sylvia Chen
Attorney, Agent, or Firm—Sughrue, Mion, Zinn, Macpeak & Seas

[57] ABSTRACT

A noise reduction apparatus in an FM stereo tuner including a circuit for generating a stereo sum signal and a stereo differential signal; a noise eliminating circuit for dividing, in accordance with several frequency bands, the stereo differential signal into several divisional signals and for outputting, in accordance with signals levels corresponding to the frequency bands, a composite signal of divisional stereo differential signals respectively corresponding to the signal levels; and a circuit for reproducing a stereo signal from the composite signal and the stereo sum signal. In another embodiment, the noise reduction apparatus includes a circuit for generating a stereo sum signal and a first stereo differential signal; a noise eliminating circuit for dividing the stereo sum signal and the first stereo differential signal into several division differential signals and several divisional sum signals, for eliminating a low-level divisional stereo differential signal in each of the frequency bands to generate a second stereo differential signal, and for outputting a composite signal representing the second stereo differential signal and those divisional stereo sum signals in the same divisional band as the eliminated divisional stereo differential signals; and a circuit for reproducing a stereo signal from the composite signal and the stereo sum signal.

9 Claims, 11 Drawing Sheets

NOISE REDUCTION APPARATUS IN AN FM STEREO TUNER

FIELD OF THE INVENTION

The present invention relates to a noise reduction apparatus for an FM stereo tuner.

BACKGROUND OF THE INVENTION

A conventional circuit for suppressing noise produced in reception of stereo broadcasting is known as a Hi-blend circuit. One such Hi-blend circuit is disclosed in Japanese patent Post-Examination No. 45-32282.

Using this Hi-blend circuit, in the case of FM stereo broadcasting, two halves of a noise component N of a stereo differential signal (L−R) in a composite signal exist in demodulated L and R signals, respectively. These two halves of the noise component N exist in such a state that the halves are in antiphase to each other. In this circuit, only the high band components of the L and R signals are added to each other, thereby cancelling the antiphase halves of the noise component N with each other, and eliminating jarring noise in a high band component.

Although the above-mentioned conventional Hi-blend circuit has a noise reduction effect on high band signal components, this circuit does not act on middle and low band signal components. Accordingly there has been a problem with the conventional Hi-blend circuit in that noise cannot be eliminated over a broad range from a low band to a high band. Moreover, there has been a further problem in that it is impossible to obtain a satisfactory stereo sense because a stereo signal becomes perfectly monaural in a high band with the Hi-blend circuit so that separation of the right and left signals is deteriorated.

SUMMARY OF THE INVENTION

It is therefore an object of the present invention to solve the foregoing problems in the prior art.

It is another object of the present invention to provide a noise reduction apparatus in an FM stereo tuner in which a noise component can be substantially eliminated over the entire frequency band without deteriorating separation.

In order to attain the foregoing objects, the noise reduction apparatus in an FM stereo tuner comprises: a circuit for generating a stereo sum signal and a stereo differential signal; a noise eliminating circuit for dividing, in accordance with a plurality of frequency bands, the stereo differential signal into a plurality of divisional differential signals and for outputting in accordance with signal levels respectively corresponding to the plurality of frequency bands, a composite signal of the divisional stereo differential signals; and a circuit for reproducing a stereo signal from the composite signal and the stereo sum signal.

In another embodiment of the invention, the noise reduction apparatus in an FM stereo tuner comprises: a circuit for generating a stereo sum signal and a first stereo differential signal; a noise eliminating circuit for dividing, in accordance with a plurality of frequency bands, the stereo sum signal and the first stereo differential signal into a plurality of divisional differential signals and a plurality of divisional sum signals, for eliminating a low-level divisional stereo differential signal in each of the plurality of frequency bands so as to generate a second stereo differential signal, and for outputting a composite signal representing one of the second stereo differential signal and a delayed divisional stereo sum signal in each of the plurality of frequency bands; and a circuit for reproducing a stereo signal from the composite signal and the stereo sum signal.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

First, the principle of a first aspect of the present invention will be generally described.

Figure 1:
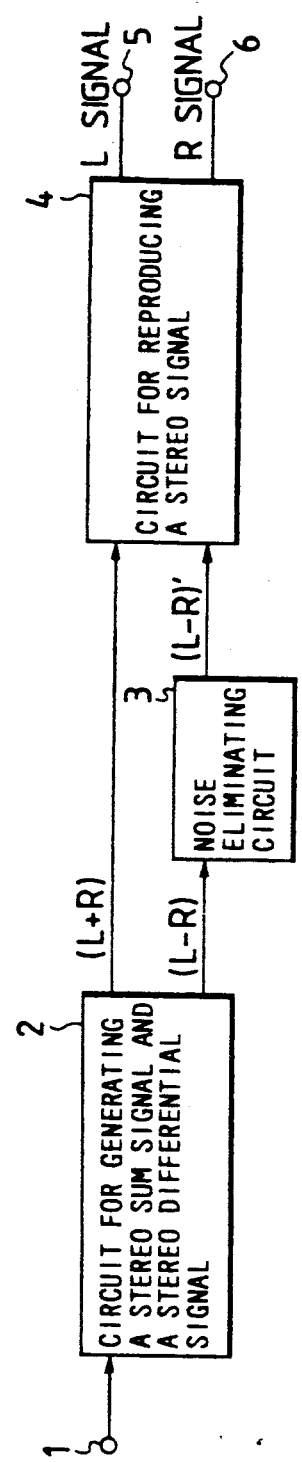
FIG. 1 is a schematic block diagram for explaining the principle of a first aspect of the present invention.

FIG. 1 is a block diagram generally showing a first aspect of the present invention. As shown in FIG. 1, the FM stereo tuner according to the first aspect of the present invention comprises: a circuit 2 for generating a stereo sum signal (L+R) and a stereo differential signal (L−R); a noise eliminating circuit 3 for dividing the stereo differential signal (L−R) into a plurality of frequency bands and for outputting a composite signal (L−R)' of divisional stereo differential signals (L−R)$_d$ in accordance with signals levels of the respective divisional bands; and a circuit 4 for reproducing a stereo signal (R,L) from the composite signal (L−R)' and the stereo sum signal (L+R).

According to the first aspect of the present invention, the stereo differential signal (L−R) produced from the circuit 2 is supplied to the noise eliminating circuit 3 so as to be subjected to noise elimination processing.

The noise eliminating circuit 3 divides the stereo differential signal (L−R) into a plurality (n) of frequency bands, performs noise elimination processing in each of the divisional frequency bands by extracting the divisional stereo differential signal (L−R)$_d$ in accordance with the signal level of each divisional frequency band, and outputs a composite signal of those divisional stereo differential signals (L−R)$_d$, that is, a composite signal (L−R)' in which a noise component is reduced.

This composite signal $(L-R)'$ is supplied to the circuit 4 for reproducing a stereo signal.

The stereo signal reproducing circuit 4 reproduces a stereo signal (L,R) from the input composite signal $(L-R)'$ and the stereo sum signal $(L+R)$. This reproduced stereo signal (L,R) is in a state such that noise is eliminated over all frequency bands, and L and R signals are not combined, so that it is possible to prevent separation from being deteriorated.

Figure 2:
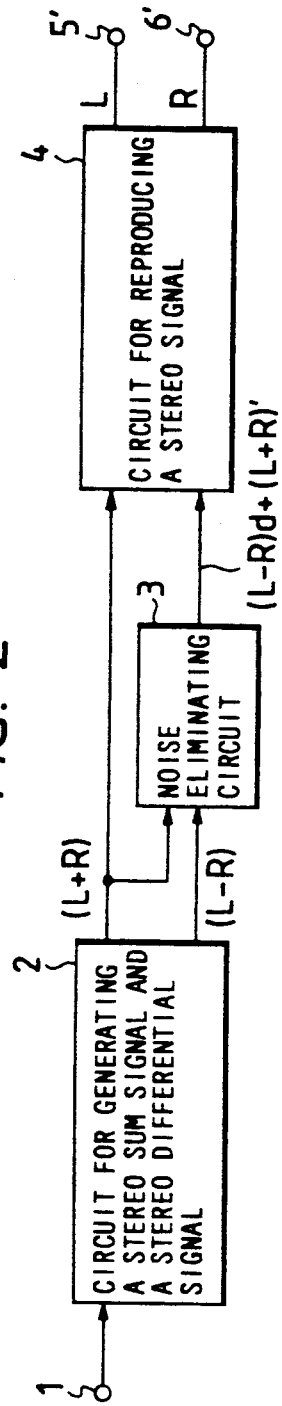
FIG. 2 is a schematic block diagram for explaining the principle of a second aspect of the present invention.

FIG. 2 is a block diagram generally showing a second aspect of the present invention. As shown in FIG. 2, the FM stereo tuner according to a second aspect of the present invention comprises: a circuit 2 for generating a stereo sum signal $(L+R)$ and a stereo differential signal $(L-R)$; a noise eliminating circuit 3 for dividing the stereo sum signal $(L+R)$ and the stereo differential signal $(L-R)$ into a plurality of frequency bands with the same dividing frequencies respectively, for eliminating a low-level divisional stereo differential signal $(L-R)_d$ in each divisional band so as to generate a second stereo differential signal, and for outputting a composite signal of the second stereo differential signal and a delay signal $(L+R)'$ of a divisional stereo sum signal in the same divisional band as the eliminated divisional stereo differential signal $(L-R)_d$; and a circuit 4 for reproducing a stereo signal (L,R) from the composite signal and the stereo sum signal $(L+R)$.

According to the second aspect of the present invention, the circuit 2 for generating a stereo sum signal and a stereo differential signal generates a stereo sum signal $(L+R)$ and a stereo differential signal $(L-R)$. The generated stereo sum signal $(L+R)$ and stereo differential signal $(L-R)$ are divided into a plurality of frequency bands with the same divisional frequencies respectively, and are subject to noise elimination processing by a noise eliminating circuit 3.

The noise eliminating circuit 3 eliminates a low-level divisional stereo differential signal in each divisional band and generates the second stereo differential signal. Although this second stereo differential signal is improved in a signal-to-noise ratio, its signal level is reduced by the degree of the eliminated noise component in comparison with the stereo differential signal $(L-R)$ provided from the circuit 2. In the noise eliminating circuit 3, however, the delay signal $(L+R)'$ of the divisional stereo sum signal in the same divisional band as that of the eliminated divisional stereo differential signal $(L-R)_d$ is added to the second stereo differential signal so as to generate a composite signal, so that it is possible to compensate for the loss of the stereo differential signal caused by the limitation of the noise component. As a result, the level of the composite signal fed to the stereo reproducing circuit 4 is not deteriorated, and it is possible to prevent deterioration in a stereo sense of the stereo signal (L,R) reproduced from the composite signal and the stereo sum signal $(L+R)$ by means of circuit 4.

Embodiments of the present invention will now be described with reference to the drawings.

First, various embodiments with respect to the first aspect of the present invention as illustrated in FIG. 1 will be described.

Figure 3:
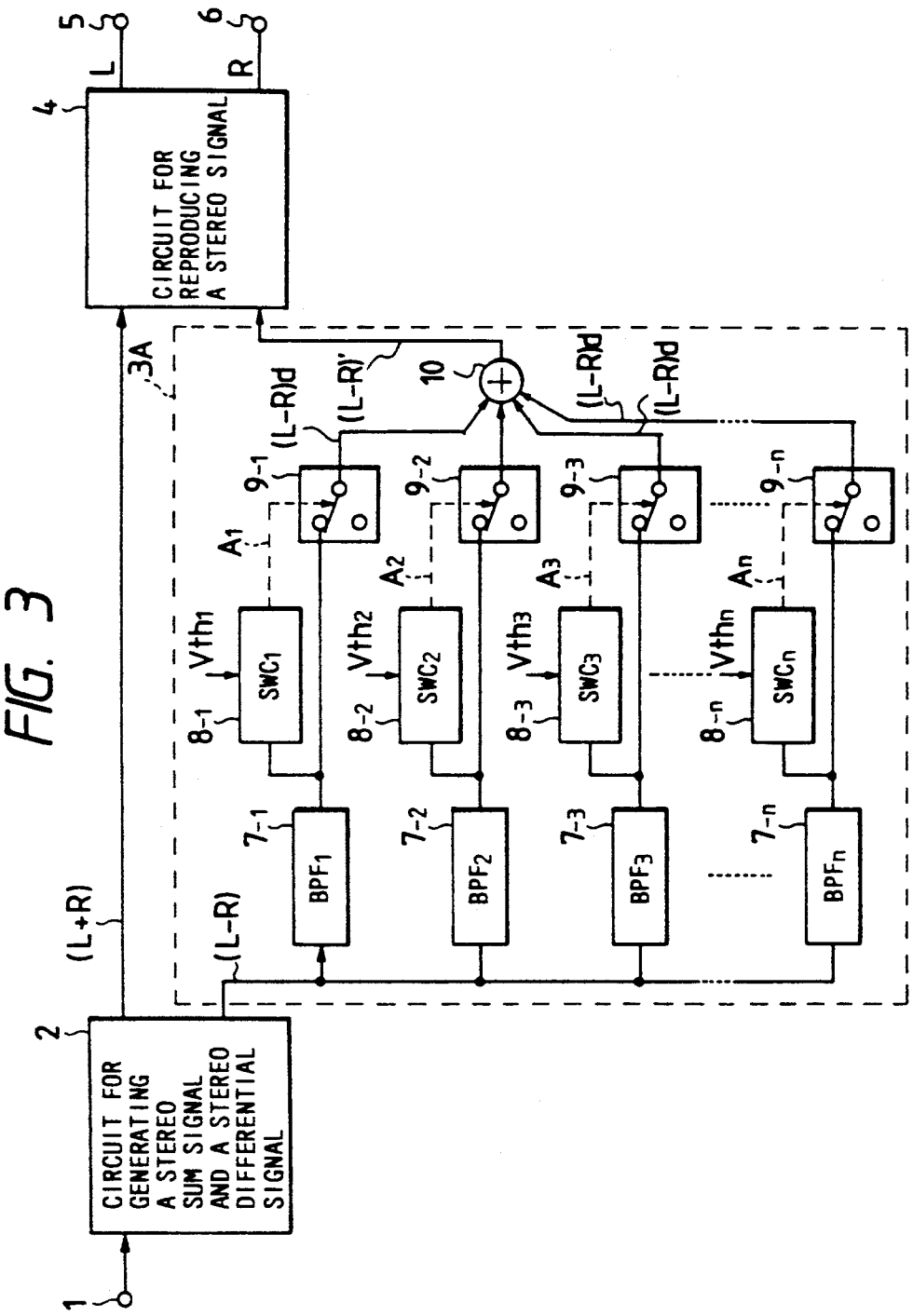
FIG. 3 is a block diagram of a first embodiment according to the present invention.

FIG. 3 shows a first embodiment of the present invention.

In FIG. 3, a noise eliminating circuit 3A includes: a plurality of band pass filters ($BPF_1$ through $BPF_n$) $7_{-1}$ through $7_{-n}$ for dividing a stereo differential signal $(L-R)$ supplied from a stereo sum signal and stereo differential generating circuit 2 into a plurality (n) of audible frequency bands; switch control circuits ($SWC_1$ through $SWC_n$) $8_{-1}$ through $8_{-n}$ for outputting switch control signals $A_1$ through $A_n$ correspondingly to divisional stereo differential signals $(L-R)_d$ provided from the respective band pass filters $7_{-1}$ through $7_{-n}$; switch circuits $9_{-1}$ through $9_{-n}$ for controlling passing of the divisional stereo differential signals $(L-R)_d$ on the basis of the switch control signals $A_1$ through $A_n$; and an adder 10 for outputting a composite signal $(L-R)'$ representing the sum of the outputs of the switch circuits $9_{-1}$ through $9_{-n}$; and divisional stereo differential signals $(L-R)_d$ passed through the respective switch circuits $9_{-1}$ through $9_{-n}$. The switch control circuits $8_{-1}$ through $8_{-n}$ have reference level signals $V_{th1}$ through $V_{thn}$, respectively, whose reference level signals correspond to noise component levels included in the respective divisional stereo differential signal $(L-R)_d$. The switch control circuits $8_{-1}$ through $8_{-n}$ compare the divisional stereo differential signals $(L-R)_d$ with their reference level signals $V_{th1}$ through $V_{thn}$, respectively, and in response to this comparison, output the switch control signals $A_1$ through $A_n$ which close the switch circuit $9_{-1}$ through $9_{-n}$ only when the divisional stereo differential signals $(L-R)_d$ exceed their reference level signals $V_{th1}$ through $V_{thn}$ respectively. The switch control circuits $8_{-1}$ through $8_{-n}$ are, for example, constituted by operational amplifiers or the like. Further, the switch circuits $9_{-1}$ through $9_{-n}$ may be, for example, switching transistors of the like. Further, the adder 10 may be an operational amplifier or the like.

In the above-mentioned configuration, a noise processing circuit is constituted by the switch control circuits $8_{-1}$ through $8_{-n}$ and the switch circuits $9_{-1}$ through $9_{-n}$.

Next, the operation will be described.

A stereo sum signal $(L+R)$ generated from circuit 2 is fed directly to circuit 4 which reproduces a stereo signal, and a stereo differential signal $(L-R)$ is fed to the noise eliminating circuit 3A.

In the noise eliminating circuit 3A, the stereo differential signal $(L-R)$ is divided into n separate signals by the band pass filters $7_{-1}$ through $7_{-n}$. The respective divisional stereo differential signals $(L-R)_d$ are compared with their reference level signals $V_{th1}$ through $V_{thn}$ in the switch control circuits $8_{-1}$ through $8_{-n}$ respectively. As a result of the comparison, the switch control signals $A_1$ through $A_n$ each has a binary value of ON/OFF are put out only when the condition $$V_{th1} \sim V_{thn} < (L-R)_d$$

is satisfied. That is, the condition $$V_{th1} \sim V_{thn} < (L-R)_d$$

means the case where a signal component of each divisional stereo differential signal $(L-R)_d$ is larger than a noise component level in the respective divisional band. In response to the switch control signals $A_1$ through $A_n$, the switch circuits $9_{-1}$ through $9_{-n}$ close (turn ON) their switches to pass the divisional stereo differential signals $(L-R)_d$ at that time. On the other hand, therefore, the other stereo differential signals $(L-R)_d$ in the divisional bands under the condition of $$V_{th1} \sim V_{thn} \geq (L-R)_d,$$

are prevented from being outputted because the switch circuits $9_{-1}$ through $9_{-n}$ are opened (turned OFF).

The respective divisional stereo differential signals $(L-R)_d$ which have passed are added to each other in the adder 10 and supplied as a composite signal $(L-R)'$ to the circuit 4 for reproducing a stereo signal. Then, since the composite signal $(L-R)'$ is composed of only the divisional stereo differential signals $(L-R)_d$ each having a low noise level, the composite signal $(L-R)'$ is reduced in its noise component in comparison with the stereo differential signal $(L-R)$ put out from the circuit 2 for generating a stereo sum signal and a stereo differential signal.

The circuit 4 reproduces a stereo signal from the stereo sum signal $(L+R)$ and the composite signal $(L-R)'$ thus reduced in its noise component, thereby generating L and R signals. It is therefore possible to reduce a noise component included in the generated L and R signals.

Figure 4:
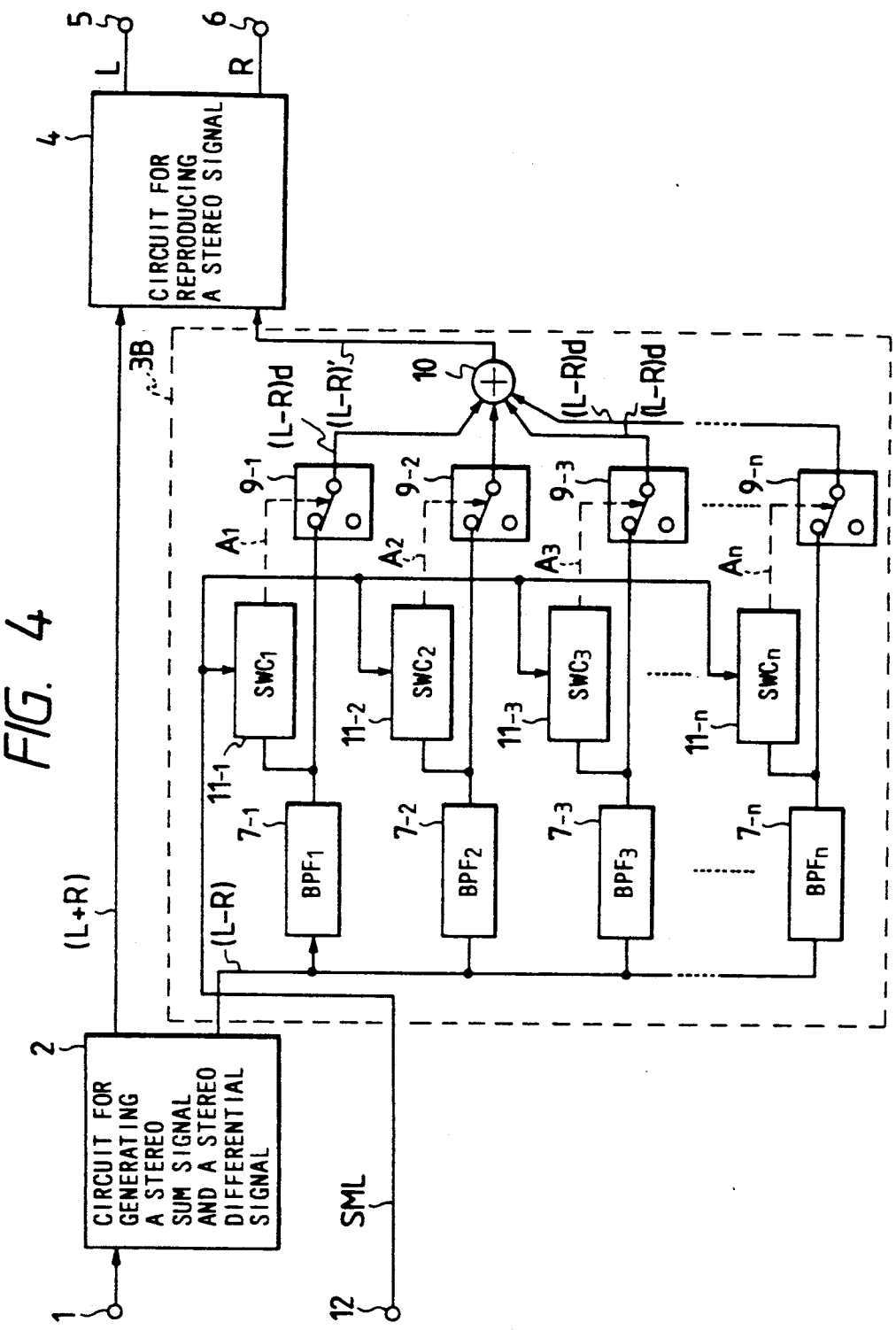
FIG. 4 is a block diagram of a second embodiment according to the present invention.

FIG. 4 shows a second embodiment of the present invention.

This embodiment has a feature in that in a noise eliminating circuit 3B, each level of the reference level signals $V_{thl}$ through $V_{thn}$ in switch control circuits $11_{-1}$ through $11_{-n}$ is controlled variably in accordance with the level of the electric field intensity in the location where an FM tuner is installed.

The embodiment of FIG. 4 is different from the FIG. 3 embodiment in that an electric field intensity level signal SML is led in through an input terminal 12 and branchingly fed to switch the control circuits $11_{-1}$ through $11_{-n}$. Items which are the same as or equivalent to those in FIG. 3 are referenced correspondingly and the descriptions about those items are omitted here as being redundant.

In this embodiment, the switch control circuits $11_{-1}$ through $11_{-n}$ have signal generators (not shown) for generating the reference level signals $V_{thl}$ through $V_{thn}$, and the electric field level signal SML is fed to the generators so that the generators generate the reference level signals $V_{thl}$ through $V_{thn}$ (corresponding to the electric field level signal SML) to reference input terminals of the comparing portions of the switch control circuits respectively.

The reason why such a configuration is made will be described. A noise component of a divisional band included in a stereo differential signal $(L-R)$ varies in accordance with the electric field intensity. If the electric field intensity is low, then the noise level is high relative to the stereo differential signal $(L-R)$, while it is low if the electric field intensity is high. Taking the reception state in various electric field intensive areas into consideration, therefore, there is a possibility that the noise eliminating effect becomes insufficient if all the reference level signals $V_{thl}$ through $V_{thn}$ are established uniformly. In this embodiment, accordingly, the reference level signals $V_{thl}$ through $V_{thn}$ are controlled automatically in accordance with the level of the electric field intensity, so that it is possible to realize a desired noise elimination on the basis of the reference level signals $V_{thl}$ through $V_{thn}$.

Next, the operation will be described.

An electric field level signal SML is fed to the switch control circuits $11_{-1}$ through $11_{-n}$. The respective switch control circuits $11_{-1}$ through $11_{-n}$ set the reference level signals $V_{thl}$ through $V_{thn}$ in accordance with the input electric field level signal SML, compare the divisional stereo differential signals $(L-R)_d$ with the reference level signals $V_{thl}$ through $V_{thn}$ respectively, feed the switch control signals $A_l$ through $A_n$ to the switch circuits $9_{-1}$ through $9_{-n}$ in the same manner as in FIG. 3, and output the divisional stereo differential signals $(L-R)_d$ only when they are higher than their respective reference level signals, so as to obtain a composite signal $(L-R)'$.

Figure 5:
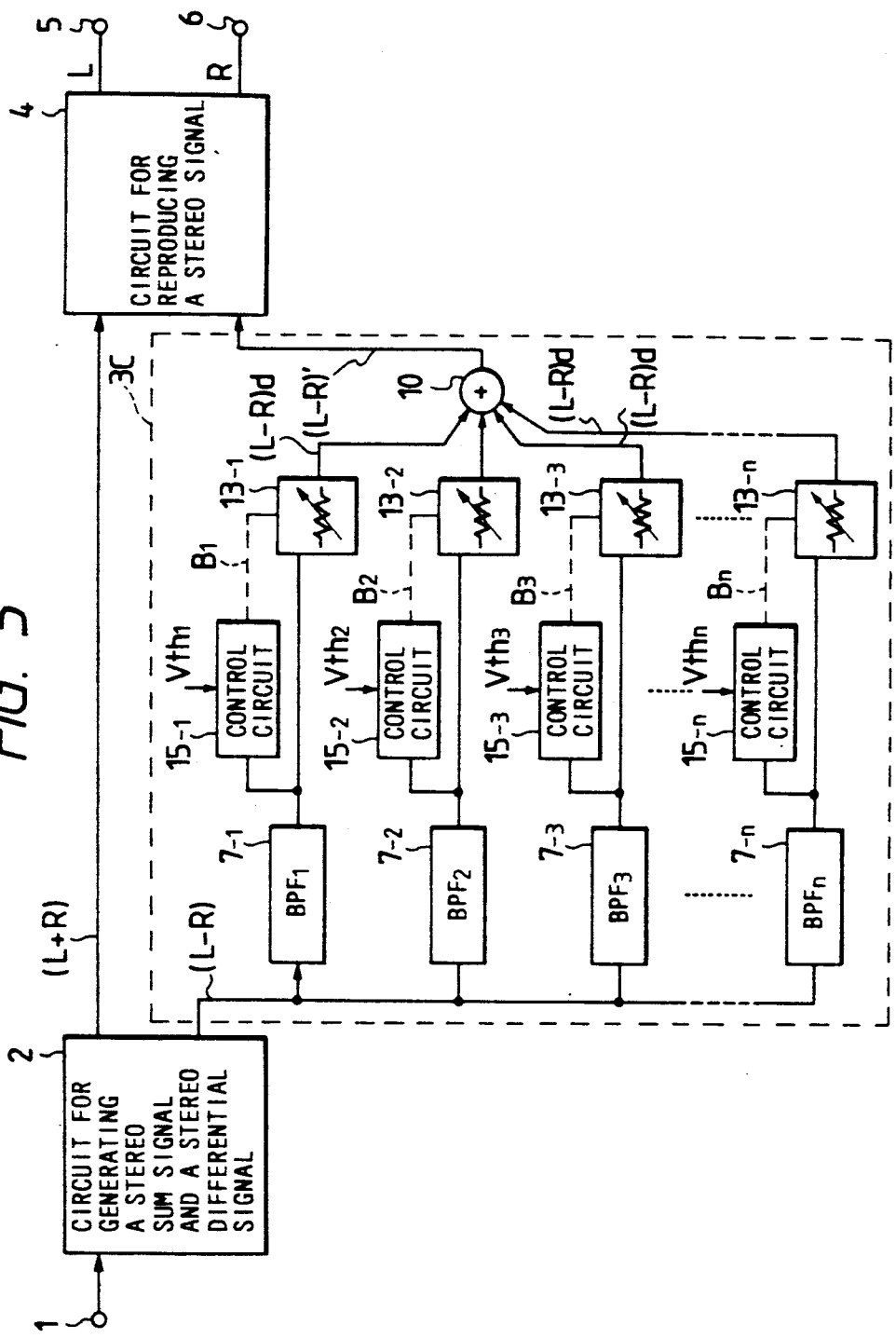
FIG. 5 is a block diagram of a third embodiment according to the present invention.

FIG. 5 shows a third embodiment of the present invention.

This embodiment has a feature in that in a noise eliminating circuit 3C, instead of using the switch control circuits $8_{-1}$ through $8_{-n}$ of FIG. 3 which output the switch control signals $A_{-l}$ through $A_{-n}$ each of which has a binary value of ON/OFF, this embodiment includes control circuits $15_{-1}$ through $15_{-n}$ which output control signals $B_l$ through $B_n$ corresponding to the quantity of deviation between the reference level signals $V_{thl}$ through $V_{thn}$ and the divisional stereo differential signals $(L-R)_d$, and instead of using the switch circuits $9_{-1}$ through $9_{-n}$ of FIG. 3, this embodiment includes variable level adjusting circuits $13_{-1}$ through $13_{-n}$ which may be voltage-controlled amplifiers or the like. Other elements shown in FIG. 5 which are the same as or equivalent to, those in FIG. 3 are referenced correspondingly, and the descriptions about those items are omitted.

Each signal level of the passing divisional stereo differential signals $(L-R)_d$ is controlled continuously and variably by use of the control circuits $15_{-1}$ through $15_{-n}$ and the variable level adjusting circuits $13_{-1}$ through $13_{-n}$, so that over the frequency bands, levels of divisional stereo differential signals of omitted frequency components are not extreme and it is therefore possible to reduce an unnatural sense in separation on audition.

Figure 6:
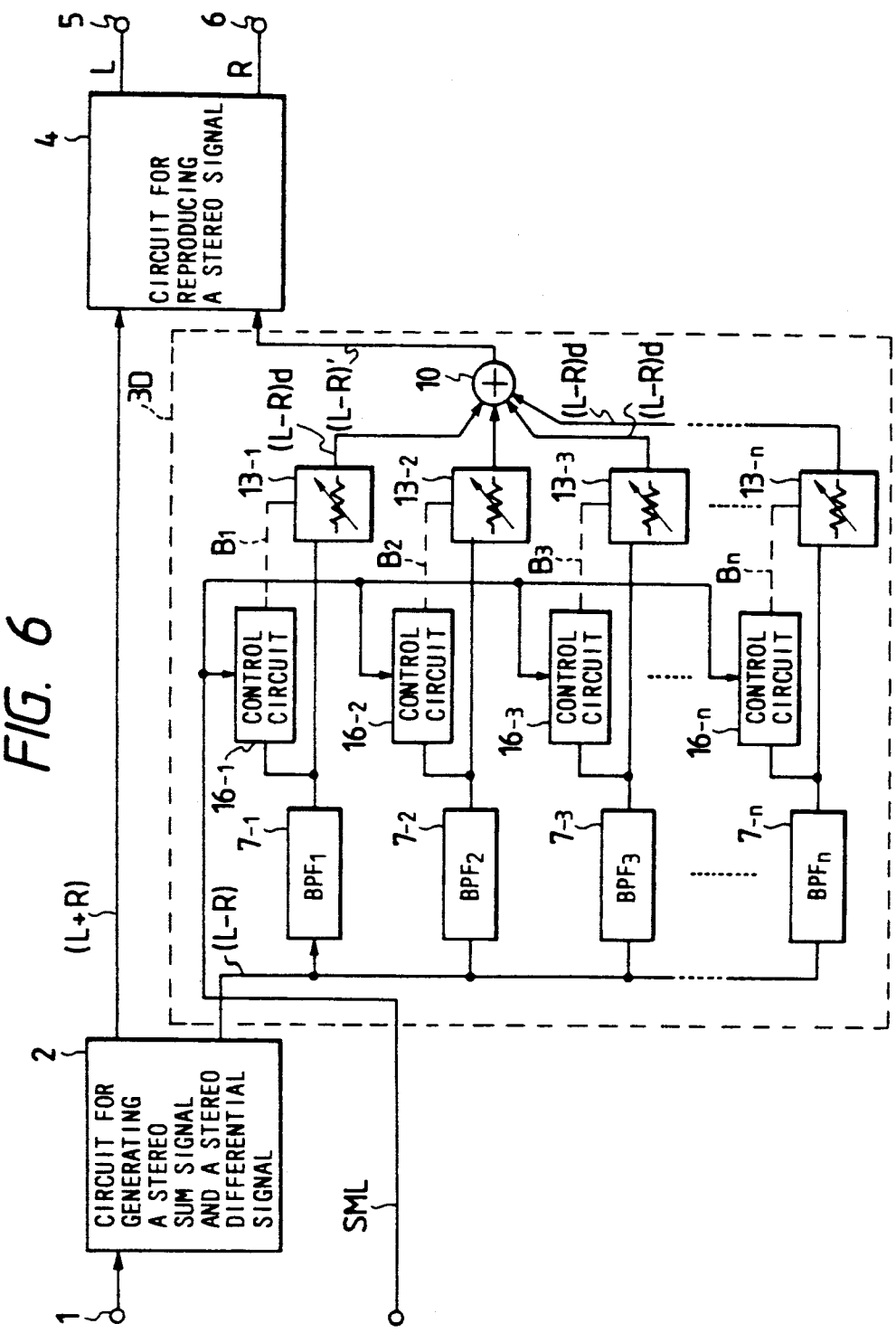
FIG. 6 is a block diagram of a fourth embodiment according to the present invention.

FIG. 6 shows a fourth embodiment of the present invention.

This embodiment has a feature in that a noise eliminating circuit 3D, based on the third embodiment of FIG. 5 and in the same manner as the second embodiment, in order to make it possible that the respective levels of the reference level signals $V_{thl}$ through $V_{thn}$ in the control circuits $15_{-1}$ through $15_{-n}$ are set variably in accordance with the electric field intensity in the location where the FM tuner is installed. An electric field level signal SML is supplied from the input terminal 12 and branchingly fed to the respective control circuits $16_{-1}$ through $16_{-n}$. In FIG. 6, other items which are the same as, or equivalent to, those items in FIG. 5 are referenced correspondingly, and the description about them is omitted.

By the configuration shown in FIG. 6, it is possible to realize a smoother control because it is possible to variably set the reference level signals $V_{thl}$ through $V_{thn}$ in accordance with the electric field intensity, in addition to the variable and continuous control on the divisional stereo differential signals $(L-R)_d$ in accordance with the quantity of deviation between the levels of noise components included in the respective divisional bands and the divisional stereo differential signals $(L-R)_d$.

Figure 7:
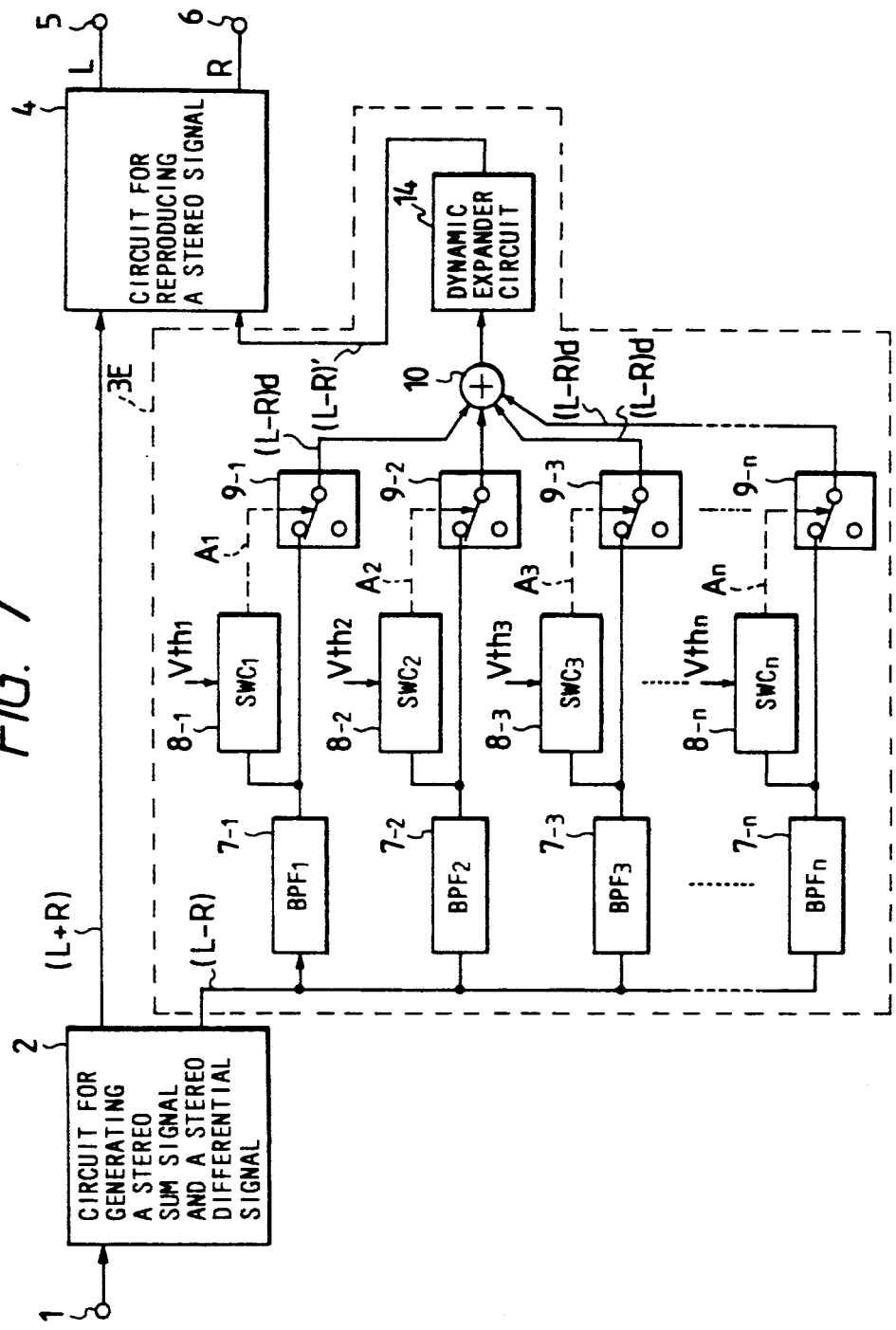
FIG. 7 is a block diagram of a fifth embodiment according to the present invention.

FIG. 7 shows a fifth embodiment of the present invention.

This embodiment has a feature in that in a noise eliminating circuit 3E, a dynamic expander 14 is inserted between the output terminal of the adder 10 and an input terminal of the stereo signal reproduction circuit 4. In FIG. 7, other items which are the same as, or equivalent to those in FIG. 3 are referenced correspondingly, and therefore the description about these items is omitted.

The reason why the dynamic expander 14 is inserted in this embodiment will be explained.

When noise elimination is performed in the noise eliminating circuit 3A, the divisional stereo differential signals $(L-R)_d$ in the respective divisional bands in which the divisional stereo differential signals $(L-R)_d$ are low in their signal level are not outputted. Accordingly the signal level of a composite signal $(L-R)'$ is reduced at least by the "not-passing" divisional stereo differential signals $(L-R)_d$, and therefore the composite signal $(L-R)'$ becomes lower than a stereo differential signal $(L-R)$ at the time of being outputted from circuit 2. Accordingly, by inserting a dynamic expander 14 in the noise eliminating circuit 3E, the level of the composite signal $(L-R)'$ can be recovered to the level of its original stereo differential signal $(L-R)$, and it is therefore possible to compensate for the deterioration of separation as well as to eliminate a noise component thereby enlarging the extension of a stereo sense.

This insertion of the dynamic expander 14 is applicable not only to the first embodiment but also to the second, third and fourth embodiments, in each of which the same effect can be obtained.

Next, various embodiments with respect to the second aspect of the present invention as illustrated in FIG. 2 will be described.

Figure 8:
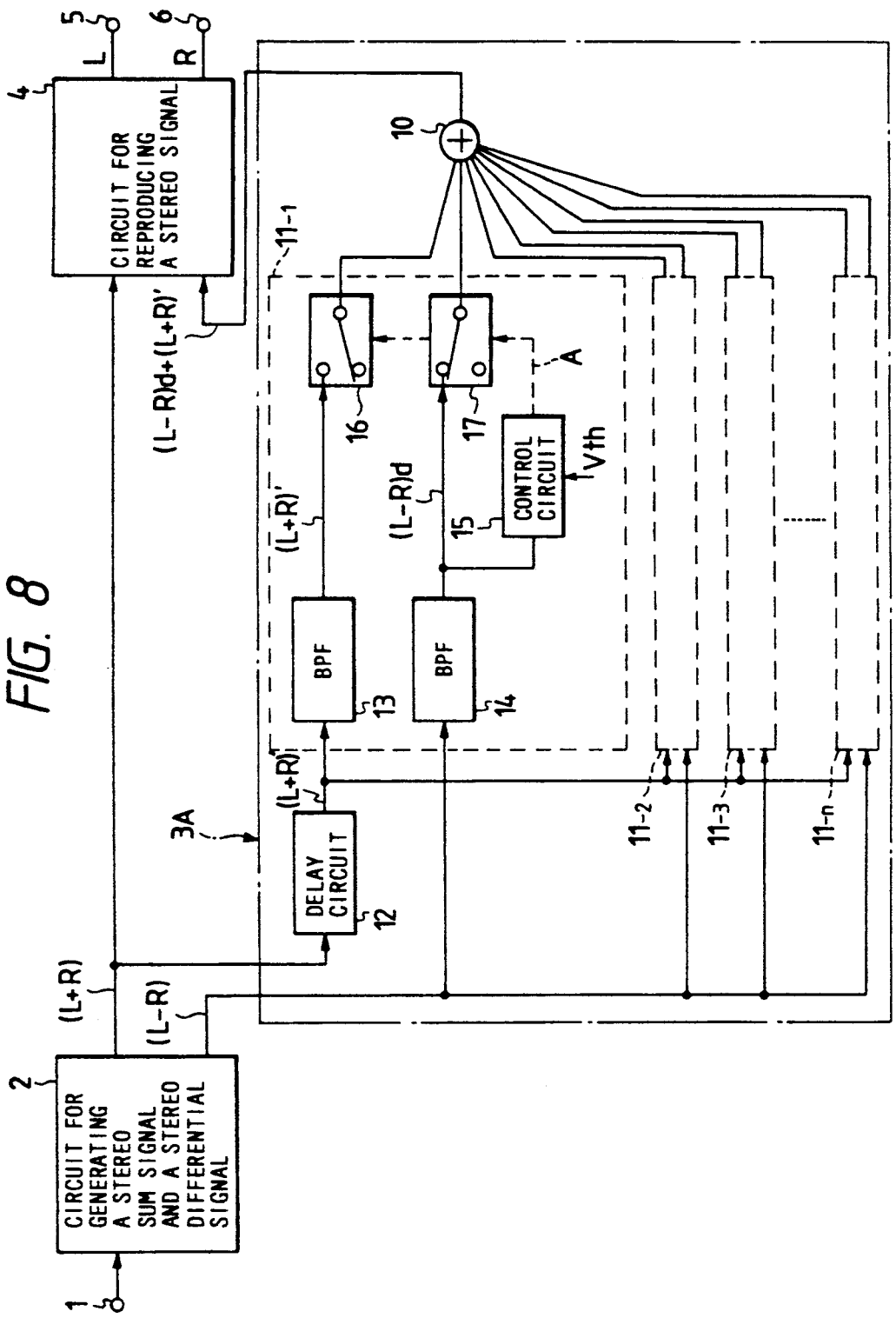
FIG. 8 is a block diagram of a sixth embodiment according to the present invention.

In FIG. 8, items which are the same as, or equivalent to, those in FIG. 3 are referenced correspondingly, and the description about these items will be omitted.

The embodiment shown in FIG. 8 has a different noise eliminating circuit than that of the embodiment of FIG. 3.

A noise eliminating circuit 3A in this embodiment includes a delay circuit 12 for outputting a signal $(L+R)'$ of a stereo sum signal $(L+R)$ delayed by a predetermined time (hereinafter simply referred to as "delay signal"), and a plurality of noise processing circuits $11_{-1}$ through $11_{-n}$ for performing noise processing by use of the delay signal $(L+R)'$ and the stereo differential signal $(L-R)$ which are fed thereto.

A single delay circuit 12 is provided so that it can be used in common to the noise processing circuits $11_{-1}$ through $11_{-n}$.

Moreover, it is possible to set the signal level of the delayed $L+R$ to a desired value.

The noise processing circuits $11_{-1}$ through $11_{-n}$ are made equal in number to the signal divisional bands which will be described later. The noise processing circuits $11_{-1}$ through $11_{-n}$ are the same in configuration to each other, while they are different from each other only in the frequency bands allocated to them respectively. Accordingly, only the noise processing circuit $11_{-1}$ will be described hereunder and the description about the remainder noise processing circuits $11_{-2}$ through $11_{-n}$ will be omitted.

The noise processing circuit $11_{-1}$ is constituted by first and second band pass filters 13 and 14 forming a signal dividing circuit for dividing a delay signal $(L+R)'$ and a stereo differential signal $(L-R)$ respectively with the same divisional frequencies within an audible frequency band, a control circuit 15 for outputting a control signal A correspondingly to a divisional stereo differential signal $(L-R)_d$ fed from the second band pass filter 14, and first and second switch circuits 16 and 17, the ON/OFF operation of which is controlled by the control signal A.

The control circuit 15 compares the divisional stereo differential signal $(L-R)_d$ in the divisional band allocated thereto with a reference level $V_{th}$ corresponding to the level of a noise component of the divisional stereo differential signal $(L-R)_d$, and outputs a control signal A when the divisional stereo differential signal $(L-R)_d$ is smaller than the reference level $V_{th}$. This control circuit 15 may be constituted, for example, by a comparator using an operational amplifier.

Upon reception of the control signal A, the first switch circuit 16 is closed to pass a divisional delay signal $(L+R)'$ fed thereto from the first band pass filter 13, and at the same time, the second switch circuit 17 is opened so as to prevent the passage of a divisional stereo differential signal $(L-R)_d$ fed thereto from the second band pass filter 14. These first and second switch circuits 16 and 17 may be constituted by switching transistors or the like.

Next, the operation will be described.

A stereo sum signal $(L+R)$ generated from the circuit 2 is fed to the delay circuit 12 and the circuit 4, and a stereo differential signal $(L-R)$ is fed to the second band pass filter 14.

In the noise eliminating circuit 3A, a delay signal $(L+R)'$, from the delay circuit 12, is fed to the first band pass filter 13.

In the first and second band pass filters 13 and 14, the delay signal $(L+R)'$ and the stereo differential signal $(L-R)$ are divided with the same divisional frequencies respectively, and a divisional delay signal $(L+R)'$ and a divisional stereo differential signal $(L-R)_d$ are supplied from the first and second band pass filters 13 and 14, respectively.

If the signal level of the divisional stereo differential signal $(L-R)_d$ is larger than the reference level $V_{th}$, the control circuit 15 does not output a control signal A, so that the second switch circuit 17 passes the divisional stereo differential signal $(L-R)_d$ to the adder 10, and the first switch circuit 16 prevents the passage of the divisional delay signal $(L+R)'$.

On the other hand, if the signal level of the divisional stereo differential signal $(L-R)_d$ is smaller than the reference level $V_{th}$ (that is, a noise component is larger than a signal component), the control circuit 15 outputs a control signal A to switch the first and second switch circuits 16 and 17. As the result, the second switch circuit 17 prevents the passage of the divisional stereo differential signal $(L-R)_d$, and the first circuit 16 passes the delay signal $(L+R)'$ to the adder 10. That is, at this time, although the divisional stereo differential signal $(L-R)_d$ is lost, the delay signal $(L+R)$ is fed to compensate for the loss.

The foregoing operation is performed in each of the noise processing circuits $11_{-1}$ through $11_{-n}$, so that their output signals, that is, the divisional delay signals $(L+R)'$ and/or divisional stereo differential signals $(L-R)_d$ are added to each other in the adder 10. The adder 10 feeds the composite signal $[(L+R)'+(L-R)_d]$ to the circuit 4 which reproduces a stereo signal. This composite signal $[(L+R)'+(L-R)_d]$ means that although a noise component is reduced by the elimination of low signal-level divisional stereo differential signals $(L-R)_d$, the delay signals $(L+R)'$ compensate for the lost signals. Accordingly, the composite signal $[(L+R)'+(L-R)_d]$ is recovered to a signal level corresponding to that of the original stereo differential signal fed from the circuit 2.

Figure 9:
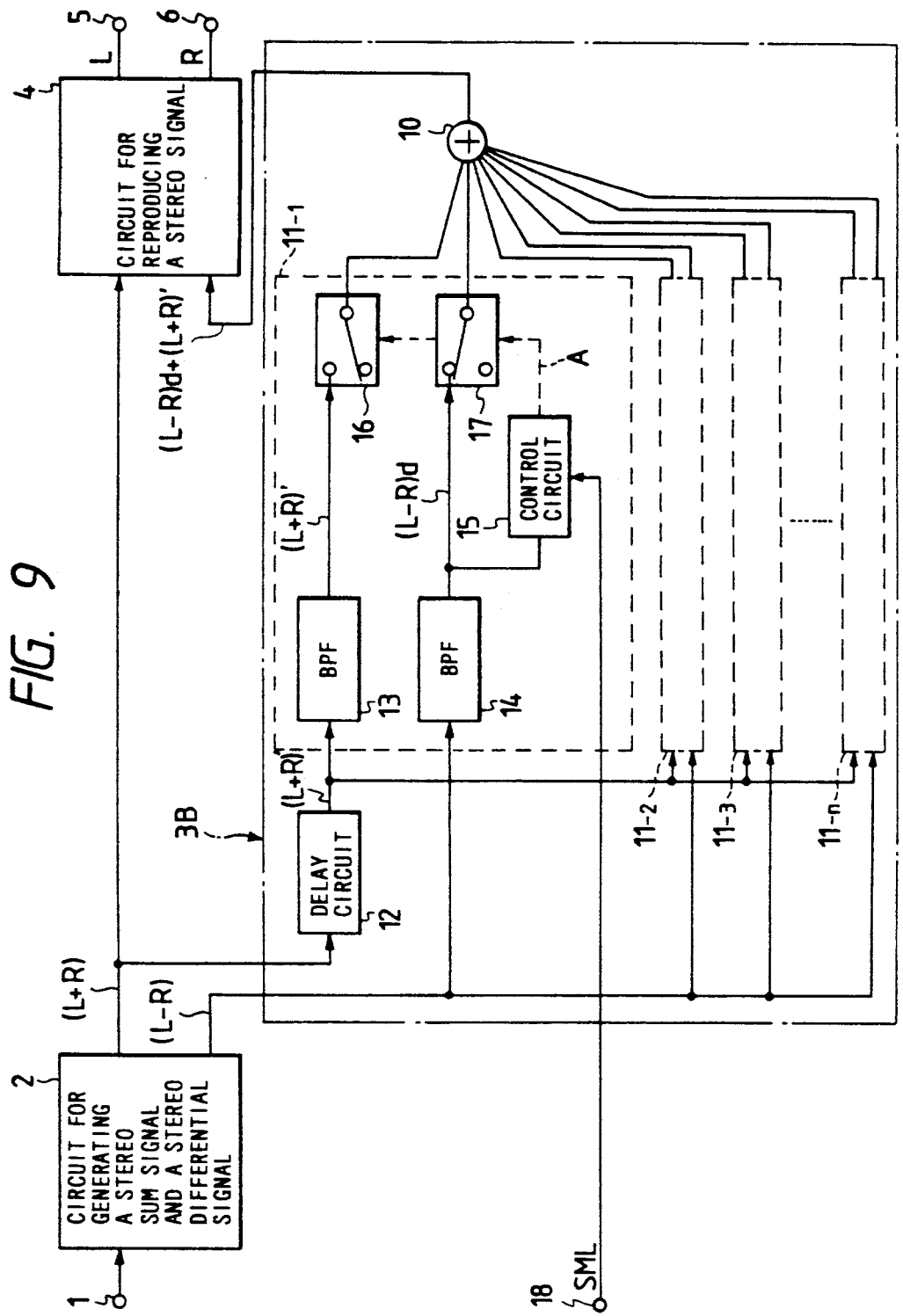
FIG. 9 is a block diagram of a seventh embodiment according to the present invention.

FIG. 9 shows a seventh embodiment of the present invention.

This embodiment has a feature in that in a noise eliminating circuit 3B, the level of the reference level signal $V_{th}$ in the control circuit 15 is controlled variably in accordance with the level of the electric field intensity in the location where the FM tuner is installed.

FIG. 9 is different from FIG. 8 in that an electric field intensity level signal SML is fed to an input terminal 18 so as to be branchingly fed to each control circuit 15. In FIG. 9, items which are the same as, or equivalent to, those in FIG. 8 are referenced correspondingly and therefore the description about these items will be omitted.

In this embodiment, each control circuit 15 has a signal generator (not shown) for generating a reference level signal $V_{th}$, and an electric field level signal SML is fed to each signal generator so that the signal generator produces the reference level signal $V_{th}$ in accordance with the electric field level signal SML at a reference input terminal of a comparing portion.

The reason why such a configuration is made will be described. The level of a noise component included in a stereo differential signal (L−R) varies in accordance with the electric field intensity. If the electric field intensity is low, the noise level is high relative to the stereo differential signal (L−R). while if the electric field intensity is high, the noise level is low relative to the stereo differential signal (L−R). Taking the reception state in various electric field intensive areas into consideration, therefore, there is a possibility that the noise elimination effect becomes insufficient if all the reference level signals $V_{th}$ are established uniformly. In this embodiment, therefore, the reference level signal $V_{th}$ is controlled automatically in accordance with the level of the electric field intensity, so that it is possible to realize desired noise elimination by the proper reference level signal $V_{th}$.

Next, the operation will be described.

An electric field level signal SML is fed to each control circuit 15. The control circuit 15 sets a reference level signal $V_{th}$ in accordance with the input electric field level signal SML, compares the divisional stereo differential signal $(L-R)_d$ with the reference level signal $V_{th}$, and feeds a switch control signal A to the switch circuits 16 and 17 in the same manner as in FIG. 8, so as to reduce a noise component and to obtain a composite signal $[(L+R)'+(L-R)_d]$ recovered to its original level.

Figure 10:
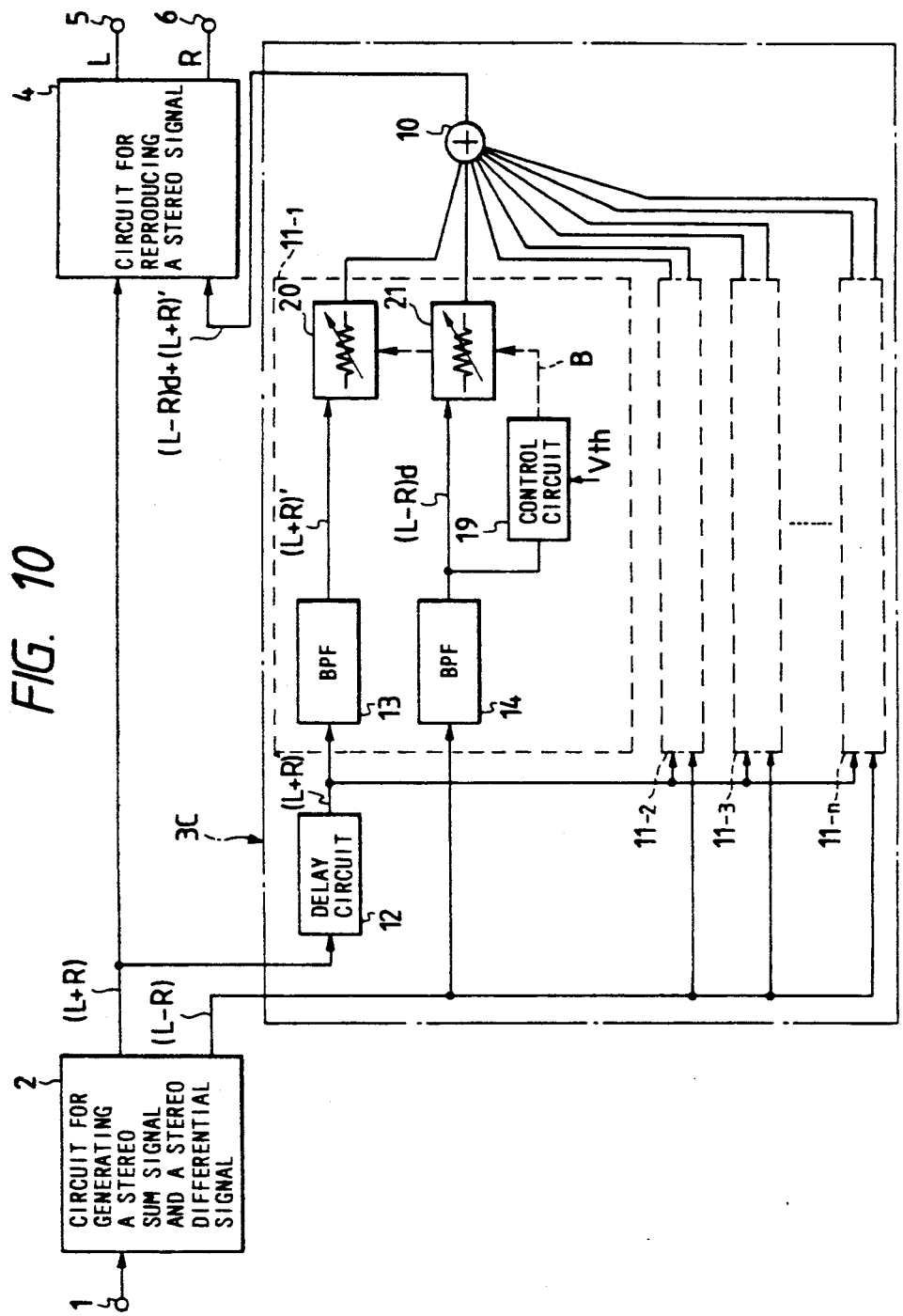
FIG. 10 is a block diagram of an eighth embodiment according to the present invention.

Next. FIG. 10 shows an eighth embodiment of the present invention.

This embodiment has a feature in that in a noise eliminating circuit 3C, instead of the control circuit 15 of FIG. 8 which outputs a switch control signal A of a binary value (ON/OFF), a control circuit 19 which outputs a control signal B corresponding to the quantity of deviation between the reference level signal $V_{th}$ and the divisional stereo differential signal $(L-R)_d$ is used, and instead of the switch circuits 16 and 17, variable level adjusting circuits 20 and 12, for example, constituted by voltage-controlled amplifiers or the like, for continuously and variably controlling the quantity of passage of the delay signal $(L+R)'$ and the divisional stereo differential signal $(L-R)_d$ are employed. In FIG. 10, items which are the same as, or equivalent to, those in FIG. 8 are referenced correspondingly, and therefore the description about these items will be omitted.

Thus, the signal level of a passing divisional stereo differential signal $(L-R)_d$ is controlled continuously and variably by use of the control circuit 19 and the variable level adjusting circuits 20 and 21, so that the levels of the omitted frequency components are not extremely unbalanced over all the divisional frequency bands, and it is therefore possible to reduce an unnatural sense of separation on audition.

Figure 11:
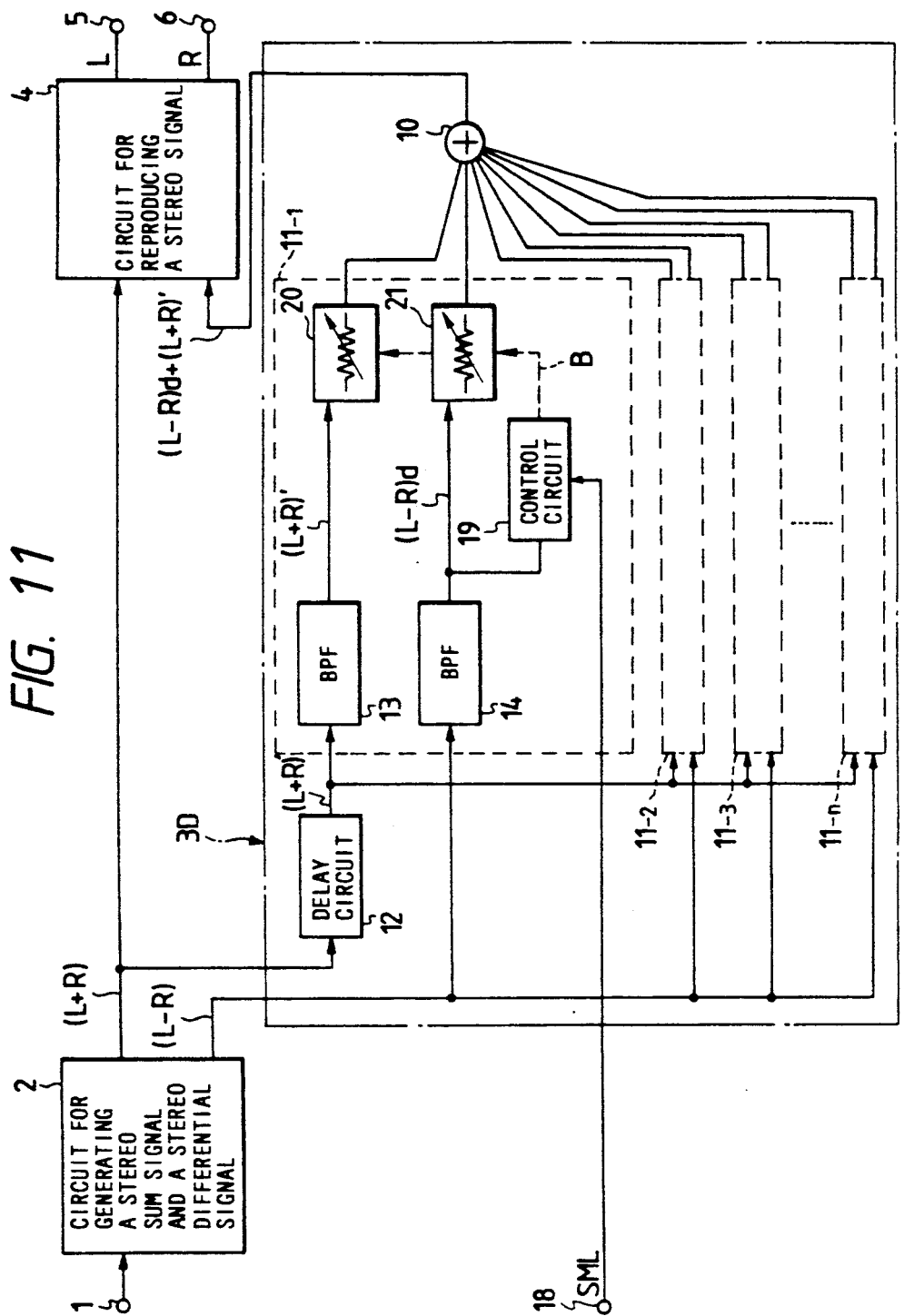
FIG. 11 is a block diagram of a ninth embodiment according to the present invention.

FIG. 11 shows a ninth embodiment of the present invention.

This embodiment has a feature in that in a noise eliminating circuit 3D, based on the eighth embodiment in FIG. 10 and in the same manner as the seventh embodiment, in order to variably set the respective levels of the reference level signals $V_{th}$ in the control circuit 19 in accordance with the electric field intensity in the location where the FM tuner is installed, an electric field level signal SML is led in from the input terminal 18 and branchingly fed to each control circuit 19. In FIG. 11, items which are the same as, or equivalent to, those in FIG. 10 are referenced correspondingly, and therefore the description about these items is omitted. By such a configuration, it is possible to realize a smoother control because it is possible to variably set the reference level signals $V_{th}$ in accordance with the electric field intensity, in addition to the variable and continuous control on the divisional stereo differential signals $(L-R)_d$ in accordance with the quantity of deviation between the levels of noise components included in the respective divisional bands and the divisional stereo differential signals $(L-R)_d$.

Figure 12:
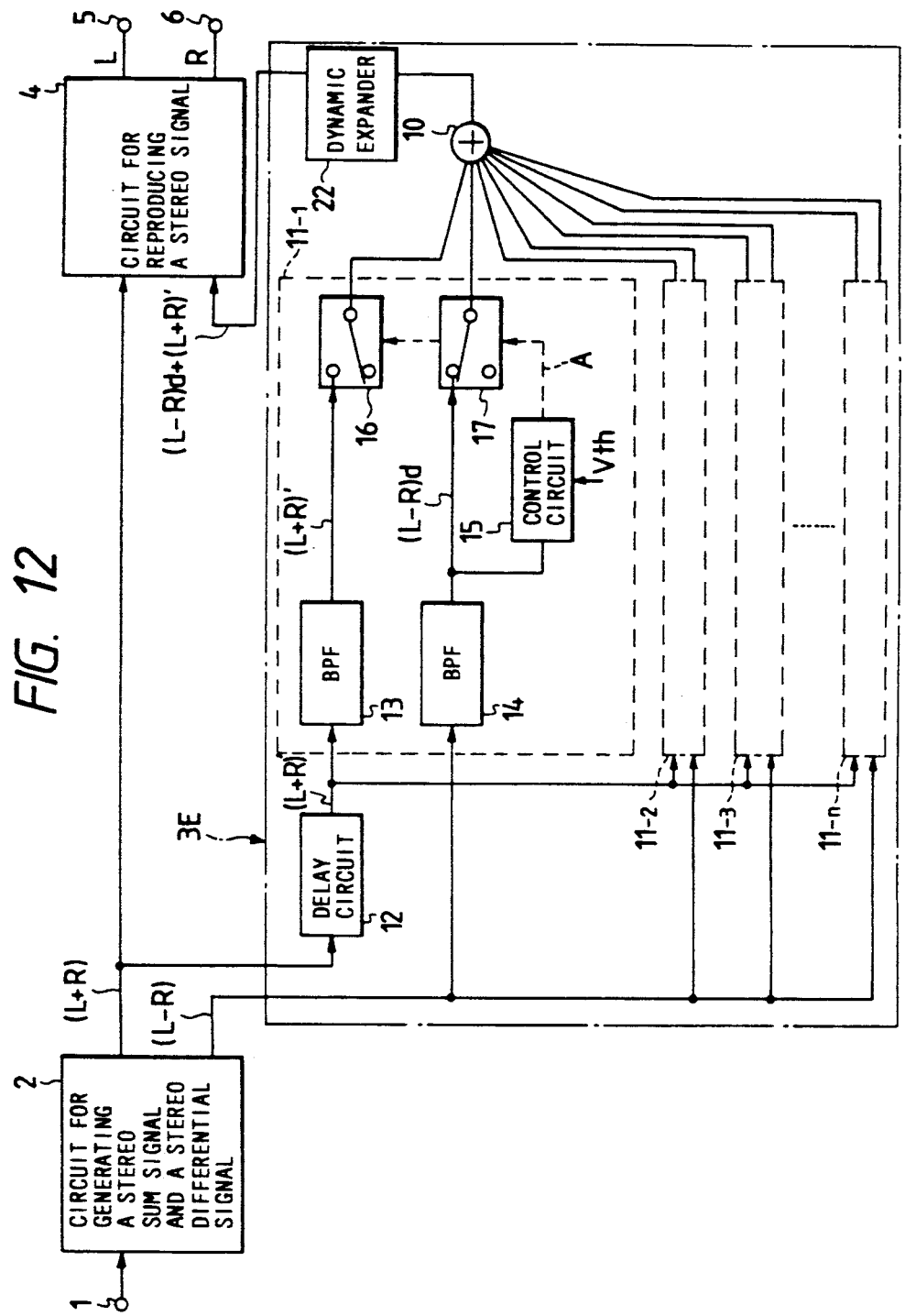
FIG. 12 is a block diagram of a tenth embodiment according to the present invention.

FIG. 12 shows a tenth embodiment of the present invention.

This embodiment has a feature in that in a noise eliminating circuit 3E, a dynamic expander 22 is inserted between the output terminal of the adder 10 and circuit 4. In FIG. 12, items which are the same as, or equivalent to, those in FIG. 8 are referenced correspondingly, and therefore the description about these items is omitted.

In this embodiment, the insertion of the dynamic expander 22 makes it possible to improve separation and therefore to improve the sense of attendance and sense of stereo.

The insertion of the dynamic expander 22 is applicable not only to the sixth embodiment but also to the seventh to ninth embodiments, in each, the same effect can be obtained.

As has been described above, according to the present invention, a stereo differential signal generated by a circuit for generating a stereo sum signal and a stereo differential signal is divided into a plurality of frequency bands, only the divisional stereo differential signals that have a level higher than a noise level in the divisional band thereof are composed, and L and R signals are reproduced by a circuit for reproducing a stereo signal, so that substantially without deterioration of separation, a noise component can be eliminated over the entire frequency bands, and it is possible to reproduce an FM stereo broadcast signal having a natural stereo sense and good tone quality.

Further, as has been described above, according to the present invention, a stereo differential signal generated by a circuit for generating a stereo sum signal and a stereo differential signal is divided into a plurality of frequency bands, and a divisional stereo differential signal lost by a noise eliminating processing performed in each divisional band is compensated with a delay signal of the stereo sum signal, so that it is possible to recover a signal level fed into a circuit for reproducing a stereo signal to the output level of the circuit for generating a stereo sum signal and a stereo differential signal. It is therefore possible to reproduce an FM stereo broadcast signal having a natural stereo sense and good tone quality.

What is claimed is:

1. A noise reduction apparatus in an FM stereo tuner comprising:
    a circuit for generating a stereo sum signal and a first stereo differential signal;
    a noise eliminating circuit for dividing said stereo sum signal and said first stereo differential signal, in accordance with a plurality of frequency bands, into a plurality of divisional differential signals and a plurality of divisional sum signals, for eliminating a low-level divisional stereo differential signal in each of said plurality of frequency bands so as to output a second differential signal representing those first differential signals not eliminated, and for outputting a composite signal representing the second stereo differential signal and only those divisional stereo sum signals in the same divisional band as said eliminated divisional stereo differential signals; and
    a circuit for reproducing a stereo signal from said composite signal and said stereo sum signal.

2. The noise reduction apparatus in an FM stereo tuner according to claim 1, wherein said noise eliminating circuit
    a dividing circuit for dividing, in accordance with the plurality of frequency bands, said stereo sum signal and said first stereo differential signal into the plurality of divisional differential signals and the plurality of divisional sum signals;
    a control circuit for comparing a divisional stereo differential signal in each of said frequency bands with a reference level signal corresponding to a noise component level of said divisional stereo differential signal, and for outputting a control signal for eliminating said divisional stereo differential signal when said divisional stereo differential signal is smaller than said reference level signal; and
    a switch circuit for interrupting said divisional stereo differential signal in response to said control signal, and, at the same time, for passing a divisional stereo sum signal in the same divisional frequency band as said interrupted divisional stereo differential signal.

3. The noise reduction apparatus in an FM stereo tuner according to claim 1, wherein said noise eliminating circuit comprises:
    a dividing circuit for dividing, in accordance with a plurality of frequency bands, said stereo sum signal and said first stereo differential signal into a plurality of divisional differential signals and a plurality of divisional sum signals;
    a control circuit for comparing a divisional stereo differential signal in each of said frequency bands with a reference level signal corresponding to a noise component level of said divisional stereo differential signal to obtain a deviation therebetween, and for outputting a control signal corresponding to the quantity of said deviation; and
    a variable level adjusting circuit for reducing the level of said second stereo differential signal in response to said control signal, and for increasing, correspondingly to the reduced level, the level of a delay signal of said divisional stereo sum signal belonging to the same divisional band as each of said eliminated stereo differential signals.

4. The noise reduction apparatus in an FM stereo tuner according to claim 2, wherein said reference level signal of said noise eliminating circuit is made variable in accordance with an input signal representing an electric field intensity of said FM tuner.

5. The noise reduction apparatus in an FM stereo tuner according to claim 3, wherein said reference level signal of said noise eliminating circuit is made variable in accordance with an input signal representing an electric field intensity of said FM tuner.

6. The noise reduction apparatus in an FM stereo tuner according to claim 1, wherein a dynamic expander circuit is interposed between said noise eliminating circuit and said stereo signal reproducing circuit.

7. The noise reduction apparatus in an FM stereo tuner according to claim 2, wherein a dynamic expander circuit is interposed between said noise eliminating circuit and said stereo signal reproducing circuit.

8. The noise reduction apparatus in an FM stereo tuner according to claim 3, wherein a dynamic expander circuit is interposed between said noise eliminating circuit and said stereo signal reproducing circuit.

9. The noise reduction apparatus in an FM stereo tuner according to claim 4, wherein a dynamic expander circuit is interposed between said noise eliminating circuit and said stereo signal reproducing circuit.

* * * * *